Aug. 25, 1959 R. W. ANNESS 2,900,776
CONTAINER PACKAGING DEVICE
Filed April 17, 1958 5 Sheets-Sheet 1

INVENTOR.
RUSSELL W. ANNESS.
BY
*Allen & Allen*
ATTORNEYS.

Aug. 25, 1959   R. W. ANNESS   2,900,776
CONTAINER PACKAGING DEVICE
Filed April 17, 1958   5 Sheets-Sheet 2

INVENTOR.
RUSSELL W. ANNESS,
BY
ATTORNEYS.

Aug. 25, 1959                R. W. ANNESS                2,900,776
                        CONTAINER PACKAGING DEVICE
Filed April 17, 1958                                5 Sheets-Sheet 5

INVENTOR.
RUSSELL W. ANNESS,
BY
ATTORNEYS.

United States Patent Office 2,900,776
Patented Aug. 25, 1959

2,900,776

CONTAINER PACKAGING DEVICE

Russell William Anness, Middletown, Ohio, assignor to Diamond Gardner Corporation, Middletown, Ohio, a corporation of Ohio Application April 17, 1958, Serial No. 729,131

20 Claims. (Cl. 53—191)

This invention relates to container packaging devices and more particularly to a packaging device by means of which a plurality of articles, such as containers, jars or the like, may be assembled, positioned on a wrap-around carrier blank, followed by the folding and gluing of the carrier parts to form an article enclosing tubular sleeve in which the articles are securely fastened and may be handled as a unit.

In recent years there has developed a growing practice of packaging canned goods in multiple unit packages, thereby inducing to the consumer to purchase several of the items instead of one. Where multiple unit purchases are made, a price concession is usually offered which makes the purchase more attractive. In other instances, the goods may be of the type which are generally bought in quantities of two or more units; and in such instances, the packages serve as a convenient means for transporting and storing the articles until they are used. Multiple unit packaging in wrap-around carriers has hitherto been limited to the packaging of cans and other essentially non-breakble containers which may be placed in side-by-side relation without intervening dividers or other means for separating the containers from contact with each other. Glass jars and other breakable containers which must be separated from each other to prevent possible breakage do not lend themselves to packaging in conventional wrap-around carrier structures. In addition to the lack of dividers or other protective means between adjacent containers, the equipment used to assemble and wrap canned goods is of such character that glass or other breakable containers could not withstand the rough handling involved. Yet there are many consumer items, such as jellies and the like which readily lend themselves to multiple unit sale; but since consumer preference dictates such items must be sold in glass containers so that the purchaser may inspect the contents, currently available packaging devices cannot be successively used. In addition to machine difficulties in handling glass containers, the conventional wrap-around carrier structure does not afford adequate visual inspection of the contents.

In order to overcome a number of the difficulties hereinbefore enumerated, there has recently been developed an improved form of wrap-around carrier structures specifically designed for glass containers. This improved container is provided with coacting pairs of flaps or flanges struck from one or both side walls of the wrap-around sleeve, the flaps extending vertically throughout the full extent of the side walls and arranged, when infolded, to provide openings through which substantial portions of each container may be viewed. At the same time, the infolded flaps act to form dividers or cushions extending between adjacent containers, thereby serving to separate the containers and prevent them from coming into contact with each other. The provision of a wrap-around carrier structure incorporating such foldable flaps in the walls thereof requires a specialized machine to handle such blanks and properly fold and position the flaps with respect to the containers as the blank is assembled about them.

Accordingly, it is a principal object of the instant invention to provide a container packaging device which will automatically position an assembly of containers on a wrap-around carrier blank having elongated flap members formed in the side walls thereof, and thereafter form the blank around the assembly of containers to form a package therefor, including the folding and positioning of the flap members between adjacent containers in the assembly.

A further object of my invention is the provision of a completely automatic device of the character described which is capable of handling breakable containers such as jelly glasses, jars and the like.

Still a further object of the invention is the provision of mechanism by means of which a continuous supply of containers may be advanced to an assembly station where a predetermined number of the containers will be assembled, placed upon the bottom wall of a wrap-around carrier blank, and the blank secured about the containers to form an enclosing tubular sleeve the side walls of which are provided with elongated window openings through which substantial portions of each container may be viewed, the said window openings being formed by the inward folding of coacting pairs of flap members which, as an incident of the machine operation, are caused to lie between adjacent ones of the containers in the package so formed.

The foregoing together with other objects of my invention which will appear hereinafter or which will be apparent to the skilled worker in the art upon reading these specifications, find their accomplishment in that construction and arrangement of parts of which an exemplary embodiment shall now be described.

Reference is now made to the accompanying drawings wherein.

Figures 5, 6:
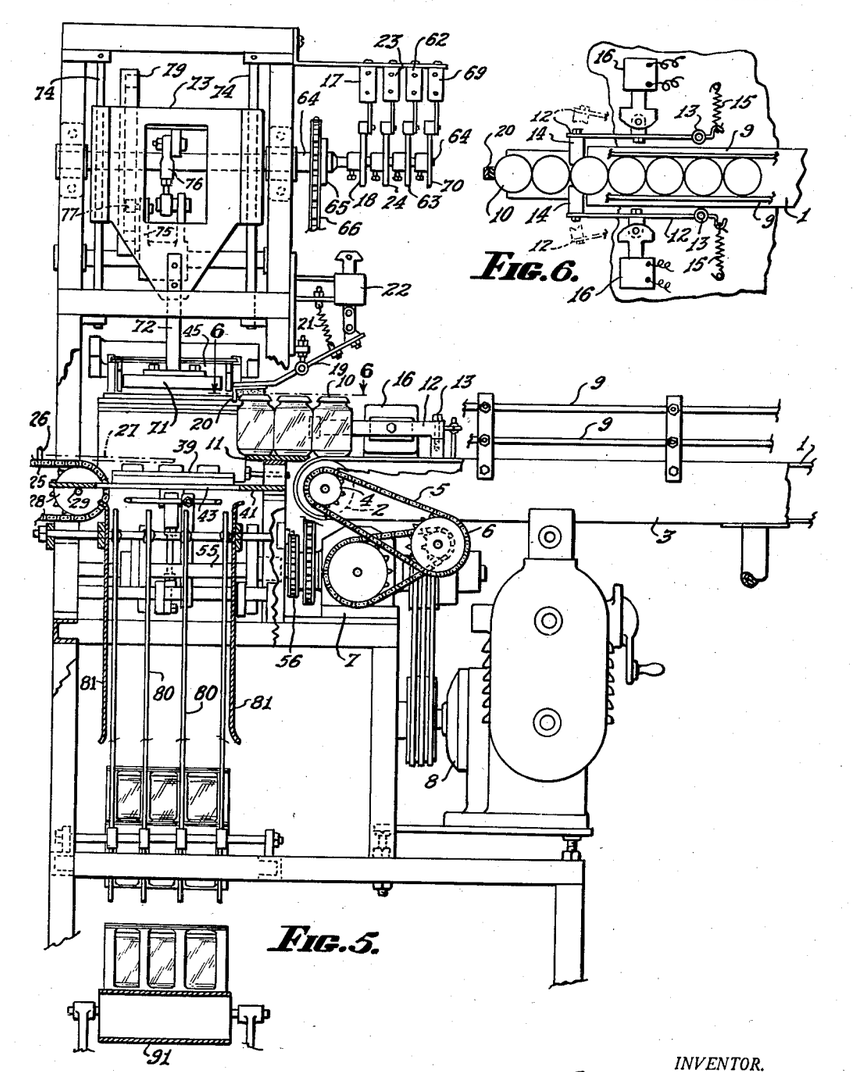
Figure 5 is a front elevational view of the device illustrating the manner in which the containers are fed to the device.
Figure 6 is a fragmentary plan view illustrating the container feeding and metering means.

Referring first to Figures 5 and 6 of the drawings, the containers to be packaged are moved to the packaging machine on a continuous belt conveyor 1 which, at its delivery end passes around a roller 2 mounted on the conveyor frame 3, the roller 2 being driven by means of sprocket 4 and chain 5, the chain also passing around a sprocket 6 which, through suitable speed reduction means 7 is powered by prime mover 8. Guide rails 9 extend lengthwise of the conveyor and are arranged to advance the containers 10 in single file. At the delivery end of the conveyor, the containers are passed onto a holding platform 11 which, in the embodiment illustrated is of a width to receive two containers in side-by-side contacting relation.

Since it is intended that the containers will be fed to the carrier wrapping station in units of two, three or more containers, metering means are provided to advance the containers into the machine in multiple units. To this end, and as best seen in Figure 6, pairs of arms 12 are mounted on either side of the conveyor, the arms being pivoted at 13 for movement in a horizontal plane about their pivot points. At their opposite ends the arms carry inwardly directed fingers 14 which are arranged, when moved inwardly, to contact opposite sides of an advancing container and arrest its forward movement. The arms 12 are biased to container engaging position by means of springs 15 and are movable outwardly to container releasing position by means of solenoids 16 adapted to be energized by switch 17 which, as will be explained more fully hereinafter, is actuated by cam 18 forming a part of the timing mechanism of the device. As will be apparent from Figures 5 and 6, the fingers 14 are positioned to arrest the movement of the last container remaining on the conveyor 1. By arresting the last container on the conveyor, the fingers serve to relieve all pushing forces against the preceding two containers which are positioned on holding platform 11.

A second stop means in the form of a pivoted arm 19 having a downwardly extending container engaging projection 20 is also provided to prevent the forward momentum of the containers from moving them beyond the inner edge of the holding platform. The arm 19 is biased to container engaging position by means of a spring 21; and the arm is moved to container releasing position by means of a solenoid 22 arranged to be actuated by a switch 23 which is closed and opened by means of a cam 24 rotated in timed relation with cam 18 and also forming a part of the timing mechanism for the machine.

The carrier blanks which are to be wrapped around the assemblies of containers are delivered to the machine on a chain conveyor 25 (Figure 5) having lugs 26 adapted to engage the rear edges of the blanks 27 to advance them into position in timed relation to the operating components of the machine. To this end, the chains 25 will pass around sprockets 28 mounted on a shaft 29 which is driven from speed reduction means 7. It will be understood that the blanks may be fed to the chain conveyors in any suitable manner from a source of supply, although I prefer to feed the blanks in accordance with the teachings of my recently issued Patent 2,817,518, dated December 24, 1957, and entitled "Blank Feeding Apparatus" wherein I have taught a device operative to successively separate the lead blank from the next adjacent blank of a blank stack, deposit the individual blanks in successive order on a blank conveyor, and arrange the successive blanks on the conveyor in precisely spaced and aligned relationship.

Figure 7:
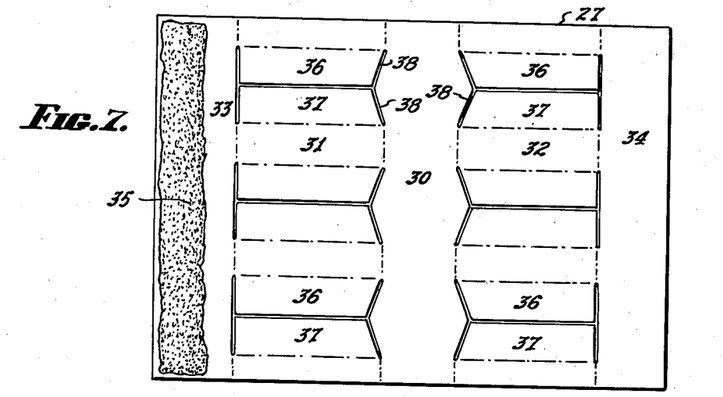
Figure 7 is a plan view of a wrap-around carrier blank of the type adapted to be tubed and filled with containers in accordance with the instant invention.

Referring now to Figure 7 of the drawings, I have therein illustrated a carrier blank of the type which will be used to package the assemblies of containers. The blank has a centrally disposed bottom wall 30 having a width of a size to receive the bottoms of the containers. Side wall panels 31 and 32 are articulated to the opposite side edges of the bottom panel and top forming panels 33 and 34 are articulated to the outer side edges of the side wall panels. The panels 33 and 34 are of a size to overlap when folded over the tops of the containers, the lapping portions forming a closure seam. In this connection, an elongated stripe of adhesive 35 will be applied to each of the blanks, preferably to the panel 33 prior to the delivery of the blanks to the machine. For example, the adhesive stripes may be applied in accordance with the teachings of my copending application Serial No. 561,332, filed January 25, 1956, now Patent No. 2,875,726, entitled "Blank Gluing Apparatus" which teaches a device for applying precisely located glue patches to continuously advancing blanks.

Each of the side wall panels is provided with coacting pairs of oppositely directed flaps 36 and 37 which, when infolded relative to the side wall panels, provide openings through which portions of the containers may be viewed. At the same time the infolded flaps serve as cushions or dividers between adjacent containers to prevent them from contacting each other in the assembled package. The innermost edges of the flaps 36 and 37, i.e. the edges adjacent the bottom panel 30, are preferably inclined, as at 38, the inclined edges serving, when the flaps are infolded, to form guiding surfaces for directing the containers into properly aligned position on the bottom wall 30.

Figures 1, 3, 4:
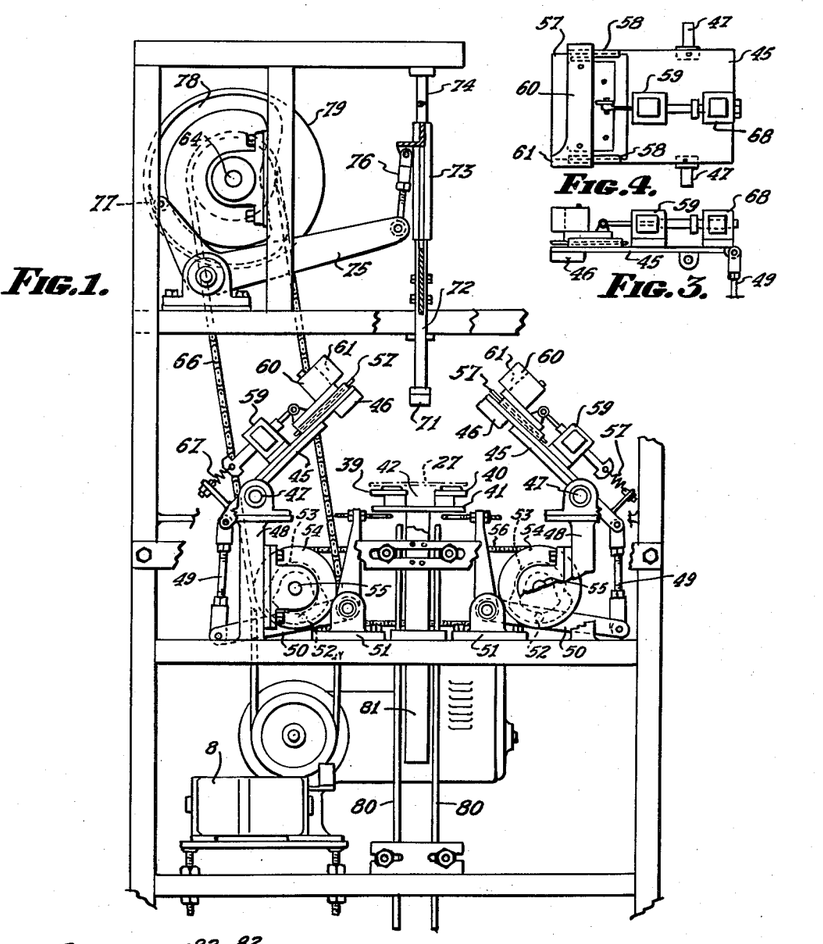
Figure 1 is an end elevational view with parts broken away of a packaging machine in accordance with the instant invention.
Figure 3 is a side elevational view of one of the pivoting platforms which coact with a fixed die to initially fold the pairs of flaps in the carrier side walls.
Figure 4 is a plan view of the pivoting platform shown in Figure 3.

As the blanks are discharged from the chain conveyors 25, they are deposited on a spaced apart pair of forming members or dies 39 and 40 which, as best seen in Figures 1 and 5, are mounted on a platform 41 secured to the machine frame. The forming members are positioned to underlie the side wall panels of the blanks, the two forming members being spaced from each other by a distance slightly in excess of the width of the bottom wall panel of the blank, the area between the two forming members forming an elongated opening 42 in communication with a coacting opening 43 (Figure 5) in the platform 41.

Figure 8:
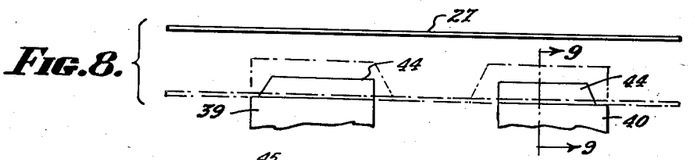
Figure 8 is an enlarged exploded view illustrating the manner in which the blank of Figure 7 is positioned for movement into contact with the fixed, flap folding die.
Figure 9:
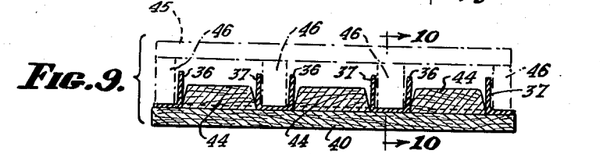
Figure 9 is a vertical sectional view taken along the line 9—9 of Figure 8.

As best seen in Figures 8 and 9, each of the forming members 39, 40 is provided with a series of three spaced apart forming blocks 44 positioned to underlie the pairs of flaps 36, 37, the construction of the blocks being such that the blank may be forced downwardly around the blocks, the blocks causing the flaps 36, 37 to fold to a substantially vertical position.

The downward movement of the blanks relative to the blocks 44 is effected by means of the pivoting platforms 45 which carry sets of fingers 46 arranged to contact the side wall panels of the blanks in the areas between the adjacent pairs of flaps and also beyond the outermost pairs of flaps. Such fingers are diagrammatically illustrated in Figure 9 of the drawings.

As best seen in Figure 1, the pivoting arms 45 are pivotally connected at 47 to standards 48 mounted on the machine frame. The arms are pivoted by means of links 49 which connect the rearmost ends of the arms to the outer ends of actuating bars 50 which are pivoted at their inner ends to brackets 51. The actuating bars 50 mount cam followers 52 which follow the cam grooves 53 of cams 54. The cams 54 are mounted on shafts 55 which are driven by chains 56 operatively connected to speed reduction means 7. Thus, as the cams 54 rotate, the pivoted arms will be pivoted inwardly into blanks contacting position in timed relation to the movements of the other operating components of the machine. As best seen in Figures 3 and 4 of the drawings, each of the arms mounts a sliding plate 57 slidable in brackets 58, the plates being movable inwardly and outwardly by means of solenoids 59. When actuated, the solenoids serve to project the plates 57 outwardly to overlie the opening 42 between the forming members 39, the extending plates providing a supporting platform overlying the carrier blank onto which the assemblies of containers are fed. Guide members 60 are also mounted on the arms 45 to align the containers as they are delivered onto the extended plates, the guide members having inwardly projecting abutments 61 which serve as stops for the containers.

The solenoids 59 are adapted to be actuated by a switch 62 (Figure 5) the opening and closing of which is controlled by cam 63 mounted on timing shaft 64. This shaft also mounts the cams 18 and 24 for the switches 17 and 23, respectively, which actuate other components of the machine; and the shaft 64 is driven from sprocket 65 and chain 66 which is driven from the speed reduction means 7. As seen in Figure 1, the solenoids 59 may be retracted by means of springs 67 operative, when the solenoids are deenergized, to return the plates 57 to their rearward or retracted position. Alternatively, as seen in Figures 3 and 4, return solenoids 68 may be utilized, the return solenoids being actuated by a switch 69 and cam 70 (Figure 5) mounted on the timing shaft 64.

A plunger 71 is mounted for reciprocating movement relative to the containers, the plunger acting, in a manner to be explained more fully hereinafter, to press downwardly on the tops of the containers so as to move them downwardly through opening 42 between the forming members 39, 40. The plunger is mounted on a shaft 72 secured at its upper end to a plate 73 slidably journaled on vertically disposed guide rods 74. The plunger is caused to reciprocate by means of a bell crank 75 one arm of which is connected by a link 76 to the plate 73, the other arm being provided with a cam follower 77 adapted to ride in the groove 78 of a grooved cam 79 mounted on the timing shaft 64 for rotation therewith.

Figure 2:
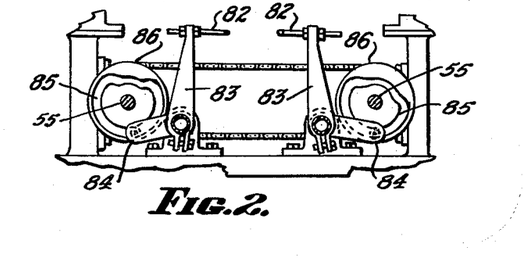
Figure 2 is a fragmentary elevational view of folding fingers effective to sequentially infold the top forming parts of the carrier blank.

A chute composed of spaced apart rods 80 and end plates 81 extends downwardly beneath platform 41 in alignment with openings therein, the chute being of a size to resiliently engage and hold the folded container blanks and the containers therein as they are moved downwardly by the plunger. As the partially folded blanks move downwardly in the chute a distance sufficient to clear the platform 41, a pair of folding fingers 82 (best seen in Figure 2) act to sequentially infold the top forming panels 33 and 34 of the carrier blank, thereby juxtaposing the glue area 35 on the under surface of top forming panel 33 to the upper surface of panel 34. The fingers 82 are mounted on bell cranks 83, the bell cranks having cam followers 84 engaging the grooves 85 of cams 86 which are mounted on the shafts 55. These shafts, it will be remembered, also drive the cams 54 which actuate the pivoting arms.

Figure 12:
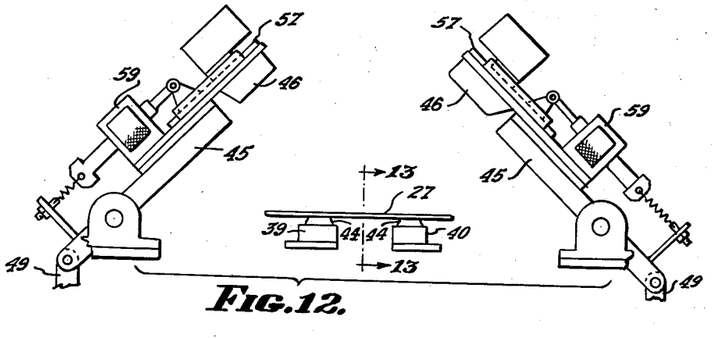
Figure 12 is an enlarged elevational view of the pivoting platforms illustrating the position of the parts as the carrier blank is fed into position.
Figure 13:
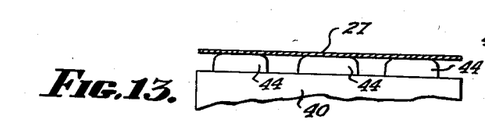
Figure 13 is a fragmentary vertical sectional view taken along the line 13—13 of Figure 12.

The operation of the device can best be understood by referring to Figures 12 through 22 of the drawings which illustrate the various operations as they are preformed by the components of the machine. Thus, Figure 12 illustrates the initial operation which is the delivery of the carrier blank 27 to a position overlying the forming members 39 and 40. During the delivery of the blank to the position illustrated, the pivoting arms 45 are in their raised position and the platform forming plates 57 are in retracted position. As also seen in Figure 13, the carrier blank 27 is supported on the blocks 44 which underlie the pairs of divider forming flaps 36, 37 defined in the side wall panels of the carrier blanks.

Figure 14:
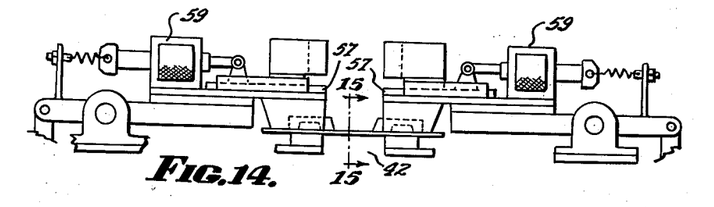
Figure 14 is an elevational view similar to Figure 12 but illustrating the pivoting platform in carrier blank contacting position.
Figure 15:
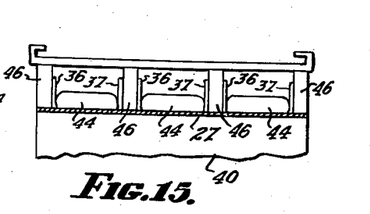
Figure 15 is a vertical sectional view taken along the line 15—15 of Figure 14.

Upon positioning of the blank on the forming members 39 and 40, the cams 54 will actuate the pivoting arms 45 to move them to their lowermost position, the parts thus assuming the position illustrated in Figure 14. As the pivoting arms move downwardly, the fingers 46 contact the portions of the blank's side wall panels lying between the blocks 44, thereby pressing the blank downwardly over the blocks, the blocks serving to sweep or fold upwardly the pairs of flaps 36, 37 bringing the blank to the position illustrated in Figure 15.

Figure 16:
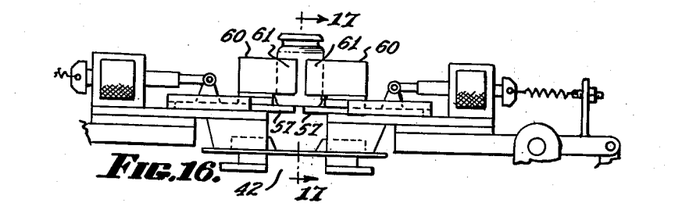
Figure 16 is a fragmentary elevational view similar to Figure 14 but illustrating the pivoted platforms with their container receiving and dropping mechanism in extended position.
Figure 17:
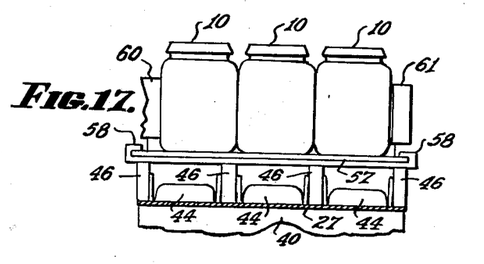
Figure 17 is a vertical sectional view taken along the line 17—17 of Figure 16.

As the pivoting arms reach their lowermost position, the solenoids 59 are actuated by cam 63 on timing shaft 64 to move the plates 57 outwardly to the position illustrated in Figure 16, the plates forming a platform overlying the opening 42 between the forming members 39 and 40. Substantially simultaneously with the inward movement of the plates 57, the cams 18 and 24 on the timing shaft 64 actuate the solenoids 16 and 22, respectively, to release a group of containers for movement onto the plates 57, the containers moving forwardly between the guide members 60 until the leading container contacts the abutment 61. The containers are thus positioned on the retractable plates 57 and overlie the bottom wall panel of the carrier blank.

Figure 18:
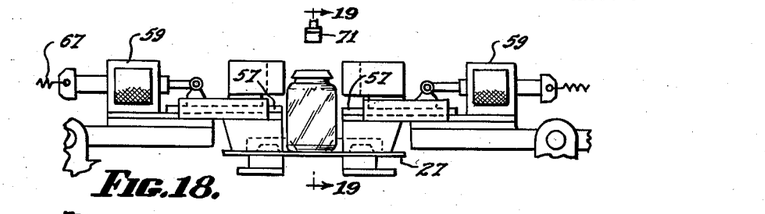
Figure 18 is an elevational view similar to Figure 15 but illustrating the container receiving and dropping mechanism in retracted position.
Figure 19:
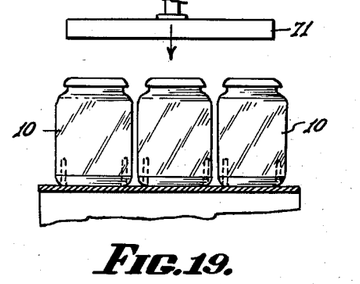
Figure 19 is a vertical sectional view taken along the line 19—19 of Figure 18.

Just as soon as the containers have been positioned on the plates, the solenoids 59 will be deenergized by the action of cam 63 and the plates will be caused to retract, either by reason of springs 67 or, where return solenoids 68 are employed, by the action of cam 70 closing the switch 69 which forms a circuit to the return solenoids. In either event, the retraction of the plates 57 results in the containers being dropped onto the bottom wall panel of the carrier blank, the part thus assuming the position illustrated in Figures 18 and 19. At the same time, the cam 79 will act to move the plunger 71 downwardly into contact with the tops of the containers.

Figure 10:
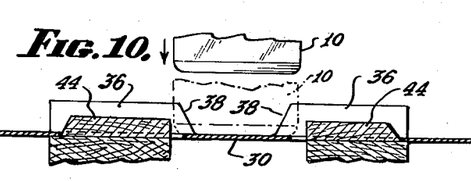
Figure 10 is an enlarged vertical sectional view taken along the line 10—10 of Figure 9.
Figure 11:
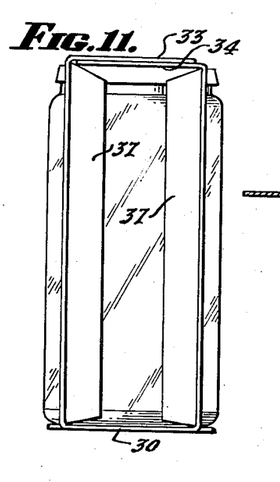
Figure 11 is an end elevational view illustrating the completed package.

Referring to Figure 10, as the containers are dropped from the retracted plates 57 onto the bottom wall panel 30 of the carrier blank, the inclined edges 38 of the flaps 36 and 37 will act as guiding surfaces effective to center the containers on the bottom wall panels in properly spaced apart relation with the edges of the flaps lying on opposite sides of each container.

Figure 20:
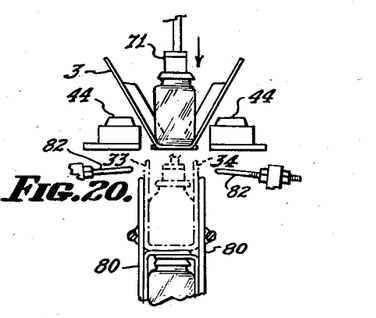
Figure 20 is a fragmentary elevational view illustrating the action of the carrier blanks as they are forced downwardly into the forming chute.

As the plunger 71 contacts the tops of the containers and presses downwardly against them, a folding action will be initiated which, as seen in Figure 20, causes the side wall's panels of the blank to be folded upwardly about the opposite sides of the containers. This action is initiated by the inner edges of the forming members 39 and 40; and as the side wall panels are folded upwardly, they are effectively removed from the blocks 44. Since the lower edges of the flaps 36 and 37 are in contact with opposite sides of each container, the containers exert a camming action against the flaps causing them to fold beyond the initial right-angle position established by the blocks and fingers. The plunger 71 will move the containers downwardly to substantially the position illustrated in dotted lines in Figure 20, in which position the body wall panels of the carrier lie within the confines of the rails 80 making up the opposite sides of the package receiving chute. The top forming panels 33 and 34 of the carrier blank extend upwardly beyond the upper edges of the rails where they are in position to be contacted by the folding fingers 82.

Figure 21:
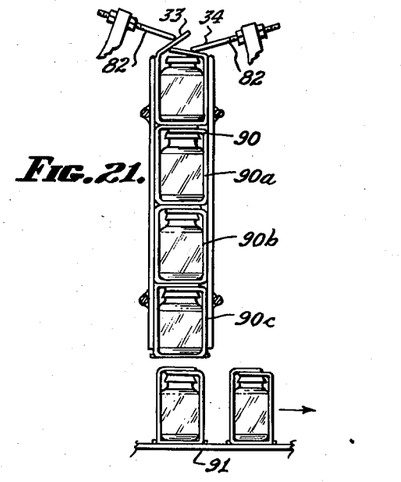
Figure 21 is an elevational view similar to Figure 20 but illustrating the lower portion of the carrier chute.

As seen in Figure 21, the folding fingers serve to sequentially infold the top forming panels 33 and 34 so as to complete the package. As already indicated, the rails 80 and end plates 81 which make up the package receiving chute are of resilient character so that the packages are retained therein. However, as the next succeeding package is moved downwardly by the plunger it will contact the upper surface of the underlying package and move it downwardly in the chute, thereby building up in the chute a series of superposed packages indicated by the reference numerals 90, 90a, 90b and 90c The superposed packages serve as pressure sealing members effective to press together the folded top forming panels of the packages in the chute. An exit conveyor 91 underlies the chute and, as the lowermost package is ejected from the chute by an incoming package, the lowermost package is conveyed away from the machine for subsequent handling, storage or the like.

Figure 22:
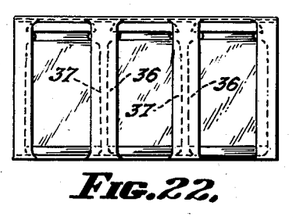
Figure 22 is a side elevational view illustrating the completed package as it leaves the device from the lower end of the chute.

As will be evident from Figure 22, the completed package has the containers tightly sealed therein with major portions of each side of the containers exposed for consumer viewing through the openings defined by the inwardly deflected pairs of flaps 36, 37. These flaps, in their infolded condition, lie between the adjoining containers and serve to cushion them against accidental contact.

Modifications may, of course, be made in my invention without departing from the spirit of it. For example, the machine may be readily modified to accommodate varying numbers of containers per package; and the packages may be provided with openings only on one side thereof instead of on both sides. In this event, one or the other of the forming members and the blocks thereon can be eliminated so that the overlying fingers carried by the pivoting arm will simply serve to press the blank downwardly into seated position.

Having, however, described my invention in certain exemplary embodiments, what I desire to secure and protect by Letters Patent is:

1. In a container packaging device, a pair of spaced apart forming members defining an opening between them, means for feeding a carrier blank onto said forming members with its bottom wall overlying the opening between said forming members, blocks on said forming members positioned to register with flaps formed in the side wall panels of the carrier blank, means for engaging the carrier blank and pressing it downwardly over said blocks so as to fold the flaps in the blank upwardly relative to the wall panels thereof, means for depositing a predetermined number of containers on the bottom wall of the carrier blank, a chute underlying the opening between said forming members, and plunger means to move the carrier blank and the containers positioned thereon downwardly through the said opening and into said chute, the downward movement of the container blank causing the side wall panels thereof to fold upwardly about the opposite sides of the containers.

2. The device claimed in claim 1 including means at the upper end of said chute operative to infold top wall forming panels of the carrier blank.

3. The device claimed in claim 2 wherein said means for feeding the carrier blank onto the forming members, the means for pressing the carrier blank downwardly over the blocks, the means for depositing the containers on the bottom wall of the carrier blank, the plunger, and the means for infolding the top wall forming panels of the carrier blank are all operated in timed relationship to each other.

4. In a container packaging device, a pair of spaced apart forming members defining an opening between them, conveyor means for feeding a carrier blank onto said forming members with its bottom wall overlying the opening between said forming members, spaced apart blocks on each of said forming members positioned to register with flaps formed in the side wall panels of the carrier blank, retractable means for engaging the carrier blank and pressing it downwardly over said block so as to fold the flaps in the blank upwardly relative to the wall panels thereof, said retractable means including a plurality of fingers arranged to coact with said blocks in interdigitating relationship, means forming a temporary platform overlying the bottom wall panel of the container blank, means for delivering a plurality of containers onto said temporary platform means, means for moving said temporary platform means to a discharge position in which containers supported thereon will be deposited on the bottom wall of the container blank, plunger means operative upon the depositing of the containers on the blank to concurrently move the blank and containers downwardly through the opening between said forming members, whereby to fold the side wall panels of the blank upwardly around the containers, and means beneath said opening for receiving the assemblies so formed as they are moved through said opening.

5. The device claimed in claim 4 wherein said container receiving platforms are mounted on said retractable means and are movable relative thereto.

6. The device claimed in claim 5 wherein said retractable means comprises a pair of pivoting arms movable from a raised position to a blank contacting position, wherein said temporary platforms are in the form of plates slidable relative to said pivoting arms, and wherein solenoids are provided to move said plates from a container receiving position to a container discharging position.

7. The device claimed in claim 6 including actuating means for said solenoids, said actuating means being operable in timed relation to the movement of said pivoting arms to blank engaging position.

8. The device claimed in claim 7 wherein said pivoting arms also mount guide means for the containers.

9. A container packaging device comprising an assembly station at which a plurality of containers are deposited on a container blank and the blank folded about the containers, means for delivering flat paperboard blanks to said assembly station, a pair of spaced apart forming members at said assembly station for receiving the paperboard blanks, projections on at least one of said forming members in alignment with flaps formed in the paperboard blanks, means for pressing the paperboard blanks downwardly over said projections, whereby to cause the flaps in the blanks to fold upwardly, means for delivering a plurality of containers to a position overlying the forming members with the containers aligned with the openings between said forming members, retractable container supporting means for initially receiving the containers and maintaining them spaced above the paperboard blanks, means for retracting said platform to release the containers for contact with the container blanks, and plunger means for concurrently moving the blanks and the containers thereon downwardly through the opening between said forming members.

10. A container packaging device comprising an assembly station, conveyor means for feeding flat conveyor blanks to said assembly station, forming means at said assembly station on which the carrier blanks are deposited, movable arms at said assembly station operative upon the delivery of each carrier blank thereto to press the blank into contact with said forming means, container receiving and positioning means overlying said forming means, conveyor means for delivering a plurality of containers to said container receiving and positioning means, means for retracting said container receiving and positioning means so as to drop the containers thereon onto the carrier blank, means for concurrently moving the carrier blank and the containers deposited thereon downwardly relative to said forming means, whereby the body wall panels of the container blanks are caused to fold upwardly about the sides of the containers, and means for thereafter folding additional portions of the carrier blanks over the tops of the containers.

11. The device claimed in claim 10 including container metering means associated with said container conveyor means for releasing predetermined numbers of containers for delivery to said assembly station.

12. The device claimed in claim 11 wherein said metering means comprises arms lying on each side of said container conveyor means, fingers on the ends of said arms for contact with the containers, and means for moving said arms and fingers from a container engaging position to a container releasing position.

13. The device claimed in claim 12 including secondary container releasing means operable in timed relationship to said first named container metering means.

14. A container packaging device comprising an assembly station at which a plurality of containers are positioned on a container blank and the blank formed about the containers, means for delivering paperboard blanks to said assembly station, forming means at said assembly station onto which the paperboard blanks are deposited, said forming means having projections in alignment with deflectable flaps formed in the side wall panels of the paperboard blanks, pivoting means for pressing the paperboard blanks over the projections on said forming means, whereby to deflect the flaps in side walls of the paperboard blanks from the planes of such side walls, container receiving and positioning means overlying said forming means, said container receiving and positioning means comprising retractable plates secured to said pivoting means, conveying means for delivering a plurality of containers to said container receiving and positioning means, means for retracting said plates so as to drop the containers onto the paperboard blank, plunger means for concurrently moving the paperboard blank and the containers thereon downwardly relative to said forming means, whereby to fold the side wall panels of the carrier blank upwardly about opposite sides of the containers, and means for thereafter folding additional portions of the carrier blanks over the tops of the containers to form a completed package.

15. The device claimed in claim 14 wherein said retractable plates mount guide means for aligning the containers thereon.

16. The device claimed in claim 15 wherein said pivoting arms, said plunger means and said means for folding over additional portions of the carrier blanks are cam-actuated, and wherein the actuating cams are driven in timed relationship to each other.

17. The device claimed in claim 16 including cam actuating means operating in timed relation to the movement of said aforementioned actuating cams for retracting said sliding plates.

18. The device claimed in claim 17 including solenoid actuated container metering means associated with said container conveying means, and cam actuated means for actuating said last named solenoids in timed relation to the movement of said aforementioned cam actuating means.

19. In a container packaging device, a spaced apart pair of forming members for receiving a flat container blank having a centrally disposed bottom forming panel and side wall forming panels articulated to the opposite side edges of the bottom forming panel, means for delivering the container blank to the forming means with the bottom panel thereof overlying the opening between said forming members, spaced apart projections on said forming members in registry with pairs of flaps defined in the body wall forming panels of the blank, movable arms overlying said forming members and movable from an inoperative position to a blank contacting position, said arms mounting fingers adapted to contact the blank at predetermined points and press it downwardly over the projections on said forming members, whereby to deflect the flaps formed in the blank upwardly relative to the panels in which the flaps are formed, a retractable plate slidably mounted on each of said movable arms, said plates each being movable from an extended to a retracted position and acting, when in the extended position, to form a container receiving platform overlying the carrier blank, and means for retracting said plates, whereby to release containers positioned thereon for contact with the carrier blank.

20. The device claimed in claim 19 including guide members secured to said plates, said guide members having inwardly projecting abutments for contact by the leading container in a group of containers positioned on said plates.

References Cited in the file of this patent
UNITED STATES PATENTS

| | | |
|---|---|---|
| 1,627,853 | Kuhn | May 10, 1927 |
| 2,605,598 | MacKenzie | Aug. 5, 1952 |
| 2,765,599 | Johnson | Oct. 9, 1956 |
| 2,815,700 | Bowman et al. | Dec. 10, 1957 |
| 2,867,157 | Moore | Jan. 6, 1959 |

UNITED STATES PATENT OFFICE

CERTIFICATE OF CORRECTION

Patent No. 2,900,776            August 25, 1959

Russell William Anness

It is hereby certified that error appears in the above numbered patent requiring correction and that the said Letters Patent should read as corrected below.

In the grant, line 3, and in the heading to the printed specification, lines 4 and 5, for "a corporation of Ohio", each occurrence, read -- a corporation of Delaware --.

Signed and sealed this 8th day of November 1960.

(SEAL)
Attest:
KARL H. AXLINE
Attesting Officer

ROBERT C. WATSON
Commissioner of Patents